(12) United States Patent
Fountain et al.

(10) Patent No.: US 7,216,052 B2
(45) Date of Patent: May 8, 2007

(54) AUTHORING DIAGNOSTIC TEST SEQUENCES APPARATUS AND METHOD

(75) Inventors: Gregory J. Fountain, Kalamazoo, MI (US); Randy L. Mayes, Otsego, MI (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 11/052,118

(22) Filed: Feb. 8, 2005

(65) Prior Publication Data
US 2006/0178791 A1   Aug. 10, 2006

(51) Int. Cl.
*G06F 9/44*   (2006.01)
(52) U.S. Cl. ............... 702/123; 702/119; 702/183; 717/109; 717/113
(58) Field of Classification Search .......... 702/108, 702/119, 120, 123, 182–185
See application file for complete search history.

(56) References Cited

U.S. PATENT DOCUMENTS 5,631,831 A      5/1997  Bird et al. ............... 701/29
5,745,712 A  *   4/1998  Turpin et al. ............ 715/763
6,690,981 B1 *   2/2004  Kawachi et al. ......... 700/83
2002/0073241 A1* 6/2002  Gilbert et al. ........... 709/312
2004/0015841 A1* 1/2004  Lepejian et al. ......... 717/109

FOREIGN PATENT DOCUMENTS

GB          2407423 A  *  4/2005

* cited by examiner

*Primary Examiner*—Manuel L. Barbee
(74) *Attorney, Agent, or Firm*—Baker & Hostetler LLP

(57) ABSTRACT

A vehicle diagnostic test sequence authoring module includes a flowchart display screen, an add node display screen, an expression builder display screen, a panel editor display screen, a phrase editor display screen, and a meter editor display screen. Each of the author module display screens include a combination of selectable fields, including editable text fields, dropdown menu fields, checkbox fields, selectable bullet fields, logical display buttons, and logical links, that facilitate development of diagnostic test sequences, represented by hierarchical flowcharts, by vehicle diagnostics experts who do not have substantial knowledge of a computer programming language. A flowchart includes multiple nodes, representing individual test steps, and branches that connect the nodes. Logical expressions based on vehicle test conditions determine the flow of the test sequence.

30 Claims, 9 Drawing Sheets

FIG. 4

AUTHORING DIAGNOSTIC TEST SEQUENCES APPARATUS AND METHOD

FIELD OF THE INVENTION

The present invention relates generally to diagnostic equipment. More particularly, the present invention relates to the authoring of diagnostic test sequences, such as vehicle diagnostic test sequences, for diagnostic systems.

BACKGROUND OF THE INVENTION

Diagnostic systems are used by technicians and professionals in virtually all industries to perform basic and advanced system testing functions. For example, in the automotive, trucking, heavy equipment and aircraft industries, diagnostic systems provide for vehicle onboard computer fault or trouble code display, interactive diagnostics, multiscope and multimeter functions, and electronic services manuals. In the medical industry, diagnostic systems provide for monitoring of body functions and diagnosis of medical conditions, as well as system diagnostics to detect anomalies in the medical equipment.

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or a patient's heartbeat rate or blood pressure. With such a system, a relatively inexperienced operator may perform advanced diagnostic procedures and diagnose complex operational or medical problems.

The diagnostic procedures for diagnostic systems of this sort are typically developed by experienced technical experts or professionals. The technical expert or professional provides the technical experience and knowledge required to develop complex diagnostic procedures. The procedures must then be programmed by computer programmers knowledgeable in a computer programming language. The diagnostic procedure computer program source code is compiled to create an object code diagnostic program, which can then be executed on a diagnostic system.

Thus, existing diagnostic systems have a disadvantage in that diagnostic procedures developed by technical experts and professionals must be programmed by computer programmers, who often are not experts in diagnostics. This process can result in unnecessary time and cost, as well as errors, which sometimes are introduced during the programming phase because of the difficulty of communicating complex diagnostics to the non-expert computer programmers. Accordingly, it is desirable to provide a method and apparatus for developing and authoring diagnostic procedures in a format that can be executed on PC-based diagnostic systems without requiring knowledge of a computer programming language.

SUMMARY OF THE INVENTION

The foregoing needs are met, to a great extent, by the present invention, wherein in one aspect an apparatus and method are provided that in some embodiments provide for developing and authoring diagnostic procedures in a format that can be executed on PC-based diagnostic systems without knowledge of a computer programming language.

In accordance with one aspect of the present invention, an authoring tool includes a flowchart module to create or modify a diagnostic test sequence. The flowchart module includes a first display image with a plurality of selectable fields to facilitate creating or modifying the diagnostic test sequence. The authoring tool also includes a panel editor module to create or modify a display panel that displays an instruction associated with the diagnostic test sequence during diagnostic testing. The panel editor module includes a second display image with a plurality of selectable fields to facilitate creating or modifying the display panel. In addition, the authoring tool includes an expression editor module to create or modify a logical expression associated with the diagnostic test sequence. The expression editor module includes a third display image with a plurality of selectable fields to facilitate creating or modifying the logical expression. In this aspect, the flowchart module incorporates the display panel and the logical expression into the diagnostic test sequence.

In accordance with another aspect of the present invention, an authoring tool includes a flowchart module to create or modify a diagnostic test sequence associated with a vehicle type. The flowchart module includes a first display image with a plurality of selectable fields to facilitate creating or modifying the diagnostic test sequence, which is represented by a hierarchical flowchart including a test step represented by a node and a flow path from the node to a next node represented by a branch. A panel editor module is included to create or modify a display panel associated with the node, which displays an instruction associated with the diagnostic test sequence during diagnostic testing. The panel editor module includes a second display image with a plurality of selectable fields to facilitate creating or modifying the display panel. The authoring tool also includes a phrase editor module to create or modify a text on the display panel, including a third display image with a plurality of selectable fields to facilitate creating or modifying the text. In addition, the authoring module includes a meter editor module to create or modify a meter on the display panel, including a fourth display image with a plurality of selectable fields to facilitate creating or modifying the meter. Furthermore, the authoring tool includes an expression editor module to create or modify a logical expression associated with the flowchart, the expression editor module including a fifth display image with a plurality of selectable fields to facilitate creating or modifying the logical expression. In this aspect, the panel editor module incorporates the text and the meter into the display panel, and the flowchart module incorporates the display panel and the logical expression into the flowchart, and the diagnostic test sequence data is stored to at least one database in a memory device.

In accordance with yet another aspect of the present invention, a method of providing diagnostic test sequence authoring capability includes the steps of displaying a first display image with a plurality of selectable fields to facilitate creating or modifying a diagnostic test sequence and a second display image with a plurality of selectable fields to facilitate creating or modifying a display panel to display diagnostic test instructions during diagnostic testing. The method also includes the steps of displaying a third display image with a plurality of selectable fields to facilitate creating or modifying a text on the display panel and a fourth display image with a plurality of selectable fields to facilitate creating or modifying a logical expression associated with the diagnostic test sequence. In addition, the method includes the step of receiving user input through direct manipulation of a graphical user interface (GUI) by way of an alphanumeric keyboard and a pointing device, including input to modify the text or input to select one of the plurality of selectable fields. Furthermore, the method includes the step of creating a diagnostic test sequence incorporating the display panel and the logical expression.

In accordance with still another aspect of the present invention, an authoring tool includes means for creating or modifying a diagnostic test sequence, including means for displaying a first display image with a plurality of selectable fields to facilitate creating or modifying the diagnostic test sequence. The authoring tool also includes means for creating or modifying a display panel that displays an instruction associated with the diagnostic test sequence during diagnostic testing, including means for displaying a second display image with a plurality of selectable fields to facilitate creating or modifying the display panel, as well as means for creating or modifying a text on the display panel, including means for displaying a third display image with a plurality of selectable fields to facilitate creating or modifying the text. In addition, the authoring tool includes means for creating or modifying a logical expression associated with the diagnostic test sequence, including means for displaying a fourth display image with a plurality of selectable fields to facilitate creating or modifying the logical expression. Furthermore, the authoring tool means for creating or modifying a diagnostic test sequence incorporates the display panel and the logical expression into the diagnostic test sequence.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 4 illustrates an exemplary display screen associated with the ADD NODE step of FIG. 1.

DETAILED DESCRIPTION

Figure 1:
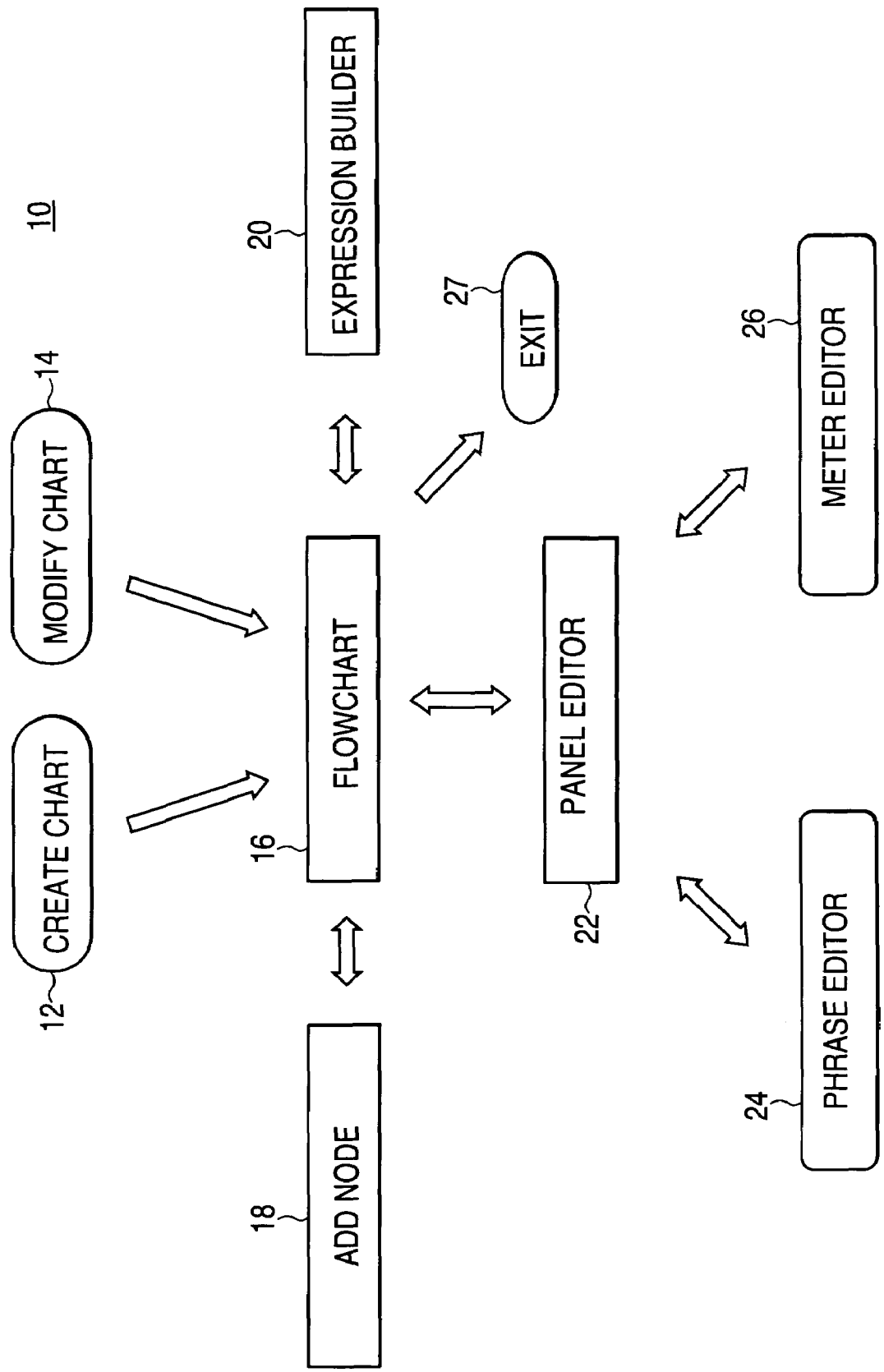
FIG. 1 is a flowchart illustrating a method in accordance with one embodiment of the method for authoring diagnostic test sequences.

The invention will now be described with reference to the drawing figures, in which like reference numerals refer to like parts throughout. An embodiment in accordance with the present invention provides a vehicle diagnostic system authoring module that facilitates authoring of diagnostic test sequences by an individual who is an expert in vehicle diagnostics but is not necessarily knowledgeable concerning a computer programming language. The vehicle diagnostic test sequence authoring module speeds development and reduces errors in diagnostic software by eliminating the need for a computer programmer to code the process as explained to him by an expert in vehicle diagnostics. This method and apparatus are particularly useful to an original equipment manufacturer for developing electronic diagnostic sequences.

The authoring module produces a vehicle diagnostics sequence for use with a PC-based vehicle diagnostics system to provide instructions for expert diagnostics procedures to allow a vehicle technician to identify the cause of a trouble code- or symptom-based problem at the component level. An example of a diagnostic method for use with a vehicle diagnostic system of this type is disclosed in U.S. Pat. No. 5,631,831, entitled "Diagnosis Method for Vehicle Systems," Bird et al., dated May 20, 1997, the disclosure of which is hereby incorporated by reference in its entirety. The diagnostic system navigates the technician through a step-by-step test sequence based on the vehicle onboard computer trouble code or the vehicle operational symptom. During vehicle diagnostics, text step instructions and information are displayed to the vehicle technician on display screen panels.

An embodiment of the present inventive method and apparatus is illustrated in FIG. 1. The authoring module 10 includes a CREATE CHART 12 and a MODIFY CHART 14. The CREATE CHART 12 allows a user to create a new chart while the MODIFY CHART 14 allows the user to modify or change an existing chart. Either the CREATE CHART 12 or the MODIFY CHART 14 is followed by a FLOWCHART 16. From the FLOWCHART 16, a user may select either an ADD NODE 18, or an EXPRESSION BUILDER 20, or a PANEL EDITOR 22. In the ADD NODE 18, the user can add a node to the flowchart. In the EXPRESSION BUILDER 20, the user can add logical expressions to a node to form a branch between that node and another node.

In the PANEL EDITOR 22, the user creates a form associated with a node representing a test step. The form has one or multiple panels, or display screens, which the user creates in the PANEL EDITOR 22. Optionally, the user selects either the PHRASE EDITOR 24 or the METER EDITOR 26. In the PHRASE EDITOR 24, the user may add text to a panel in the form. In the METER EDITOR 26, the user may add a meter to a panel, which displays a vehicle operating or diagnostic parameter, such as battery voltage or engine RPM, on a display screen. The various phrases, meters, buttons or images on a panel are sometimes referred to as controls. In addition, the user may terminate the authoring session by selecting the EXIT 27.

Figure 2:
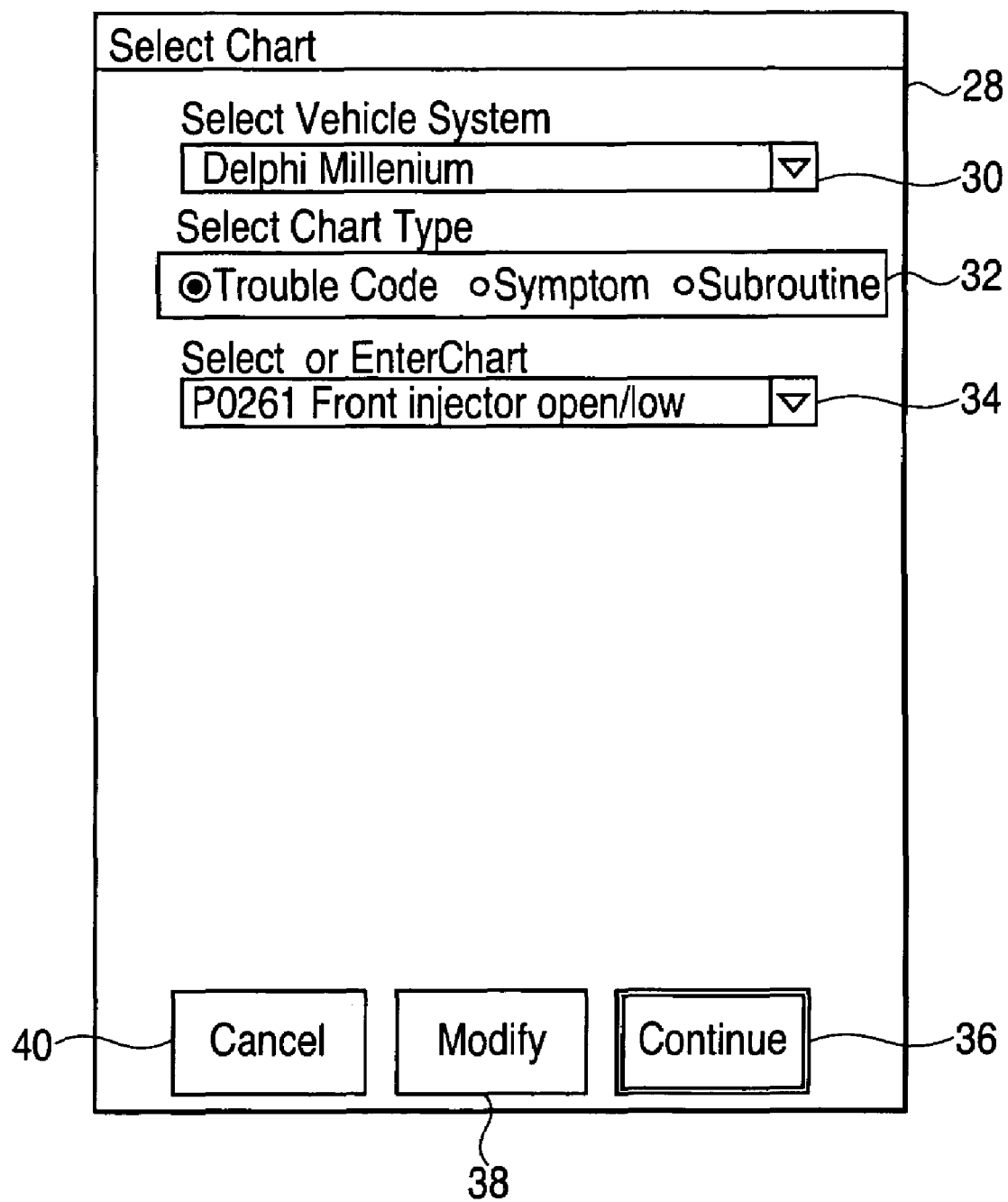
FIG. 2 illustrates an exemplary display screen associated with the CREATE CHART step or the MODIFY CHART step of FIG. 1.

An authoring module display screen 28 associated with the CREATE CHART 12 and MODIFY CHART 14 in FIG. 1 is illustrated in FIG. 2. This display screen 28 includes a dropdown menu field 30 to select the vehicle system being tested. It also includes selectable bullet fields 32 to select the type of flowchart to be created or modified, such as a trouble code, symptom or subroutine flowchart. The user can select the trouble code chart, associated with a trouble code from the vehicle electronic control unit, the symptom flow chart, associated with a specific symptom observed in the vehicle, or a subroutine flowchart, associated with an existing flowchart. The display screen 28 also includes a dropdown menu field 34 to select an existing flowchart to be modified or copied in order to produce a new flowchart. The continue button 36 at the bottom of the display screen enables the user to create a new flowchart based on the selections above, and the modify button 38 allows the user to modify an existing flowchart. Selecting either the continue button 36 or the modify button 38 takes the user to the flowchart display screen 42, illustrated in FIG. 3. Selecting the cancel button 40 ends the authoring module session.

Figure 3:
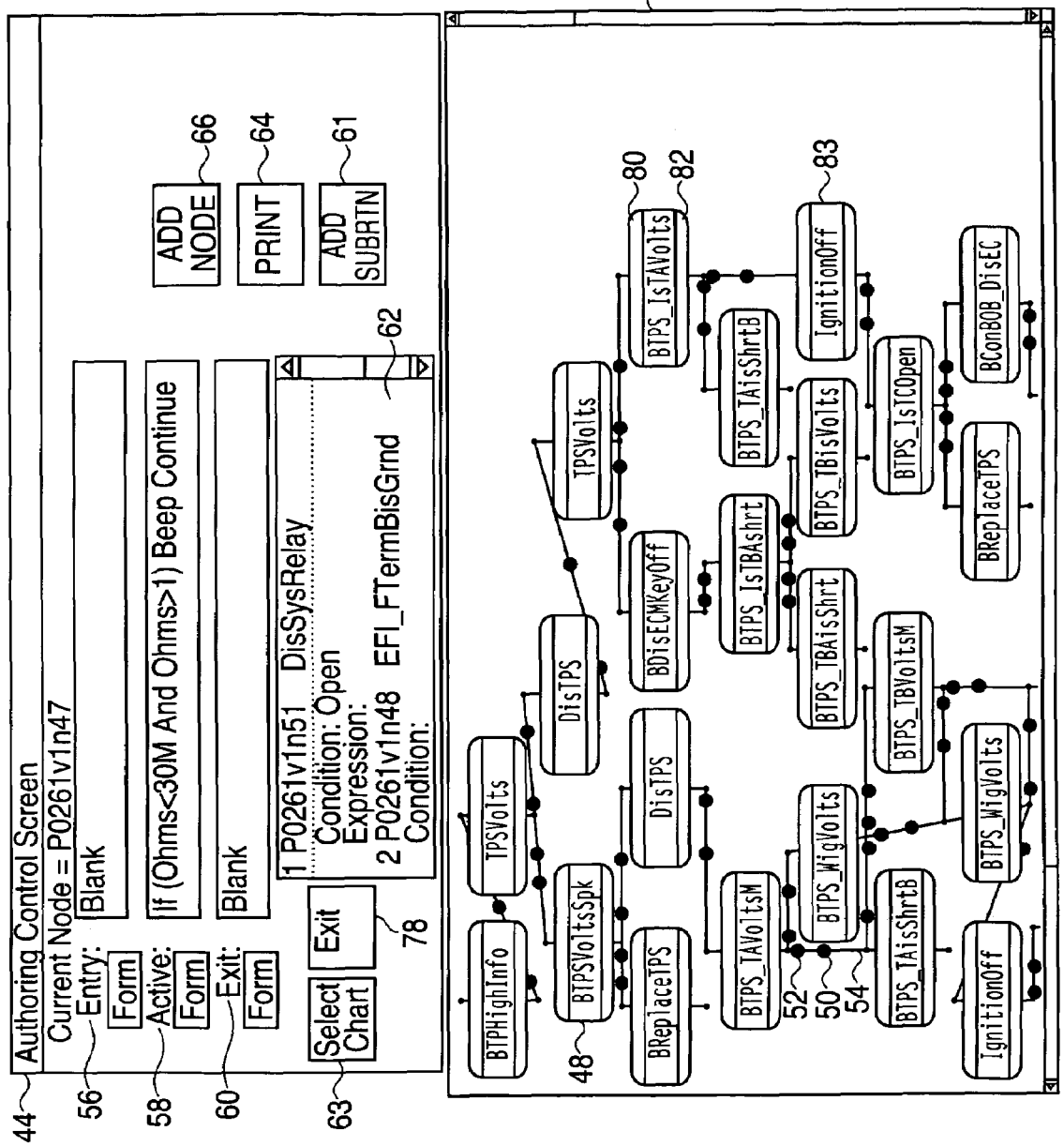
FIG. 3 illustrates an exemplary display screen associated with the FLOWCHART step of FIG. 1.

An exemplary display screen associated with the FLOWCHART 16 in FIG. 1 is illustrated in FIG. 3. In an upper portion of a flowchart display screen 42, is an authoring control screen 44. In a lower portion of the flowchart display screen 42, is a representation of a flowchart 46. The flowchart 46 represents a diagnostic test sequence, and each node 48 on the flowchart 46 represents an individual test step. Example of a test step is to check an engine sparkplug voltage or to wiggle a sparkplug wiring harness while monitoring the sparkplug voltage. Thus, each of the nodes 48 in the flowchart 46 represents a test step to be carried out in the diagnostic test procedure. The user may select a node 48 on the flowchart 46 by clicking on the node 48 with a pointing device, such as a computer mouse, a trackball or a touchscreen.

One or more logical expressions may also be associated with the node 48. For example, a logical expression may produce a certain result, or action, such as a beeping noise or a flashing light if a specified condition exists. As another example, a logical expression may state that if the vehicle battery voltage is low, that a continuous beep be sounded. In addition, a logical expression may be associated with a branch 54 between two nodes. In this case, the logical condition requires that if a particular condition exists, then the test sequence proceeds from one step or node to another step or node via the branch. For example, a logical expression may state that if the vehicle battery voltage is low at node A or during test step A, then the test sequence proceeds to node B or test step B. The round bulbs 50 on the branch 54 represent logical expressions that determine the next test step to be performed, or the flow through the flowchart. The bulb 52 closer to the test node is a node expression associated with the test step. The lines, or branches 54, between the nodes and the bulbs 50 represent the possible sequences of test steps in the test procedure.

The authoring control screen 44 in the upper portion of the screen includes three text fields 56, 58, 60 for logical expressions associated with the selected node 48. The Entry text field 56 shows a logical expression associated with entry into, or arrival at, the selected node 48, if any. An Entry expression typically is to be performed, or executed, once upon entering, or arriving at, the associated node during diagnostic testing. The Active text field 58 displays a logical expression associated with the selected node 48, if any. An Active expression generally is to be performed or executed continuously, or repeatedly, on an ongoing basis while diagnostic testing associated with the node is performed. The Exit text field 60 displays a logical expression associated with exiting the selected node 48, if any. An Exit expression typically is performed, or executed, once upon exiting the node.

From the authoring control screen 44, the user can add a sub-routine, or a sub-flowchart, to a vehicle diagnostic test sequence by clicking on a Add SubRtn button 61. The subroutine is represented by a separate sub-flowchart dependent on the current test sequence flowchart 46.

The authoring control screen 44 in the upper portion of the screen also includes a text field 62 that shows each condition or expression associated with the selected node 48. The user can print the flowchart display screen 42 by clicking on a print button 64. A select chart button 63 returns the user to the CREATE CHART or MODIFY CHART screen 28 (FIG. 2). The user may add a new node 48 to the flowchart 46 by clicking on an add node button 66 with the pointing device.

Figure 4:
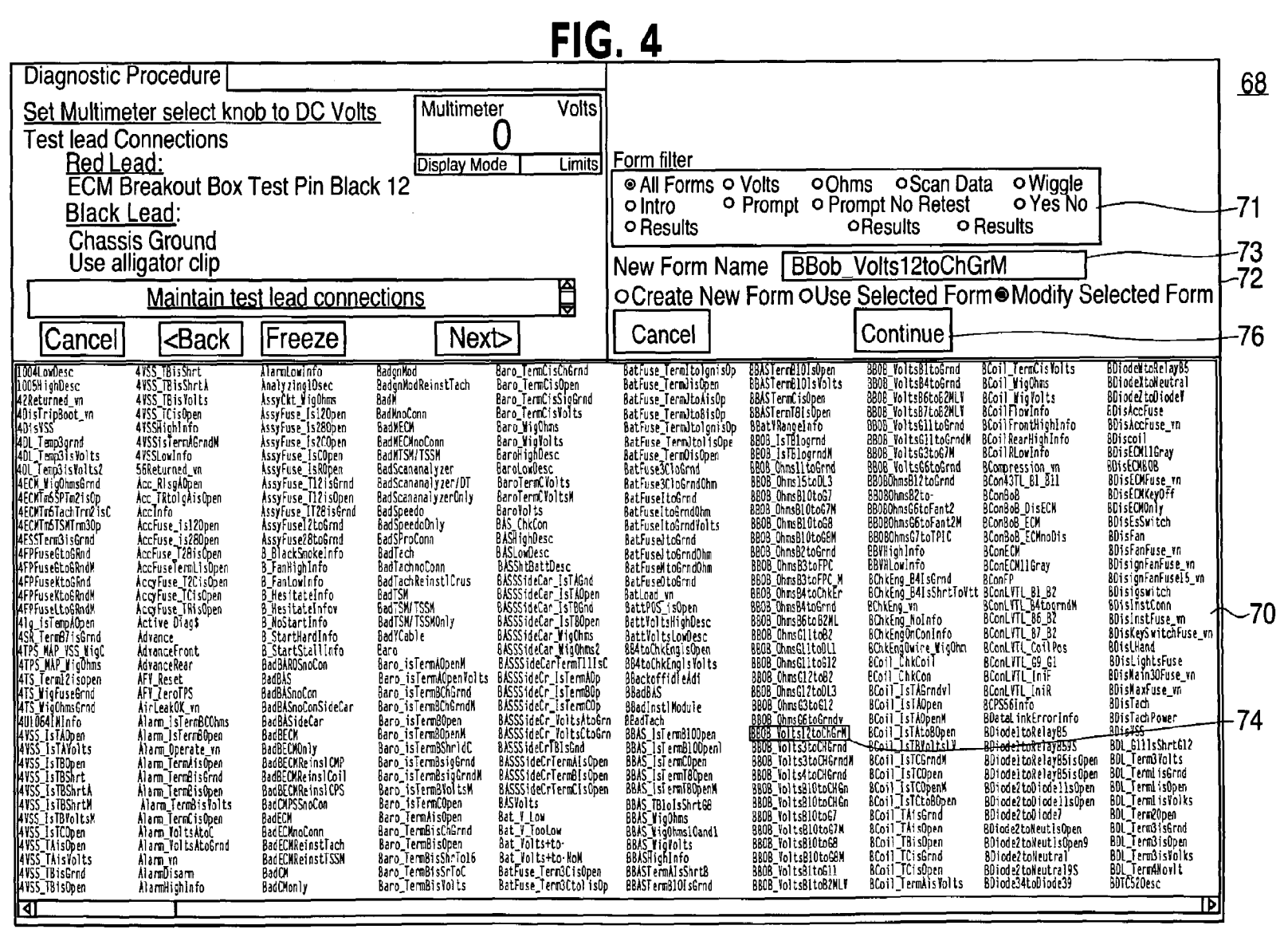

When the add node button 66 is selected, an add node screen 68 appears as illustrated in FIG. 4. The add node screen 68 includes a form listing 70 which displays the names of the forms associated with all of the nodes 48 that have been created for the selected vehicle system 30. The add node screen 68 includes selectable form filter bullets 71 that permit the user to view only a selected category of nodes in the form listing 70.

The user may choose to create a new form, to use an existing form without modification, or to modify an existing form with the form selectable bullets 72. An existing form is selected for use or modification by selecting a form name 74 from the form listing 70. A name for a new or modified form is entered into the new form name text field 73. The continue button 76 is clicked in order to add the form associated with a new node 48 in the flowchart 46. The screen then returns to the flowchart display screen 42 (FIG. 3). The user may end the authoring session by selecting the Exit button, 78 on screen 42.

Figure 5:
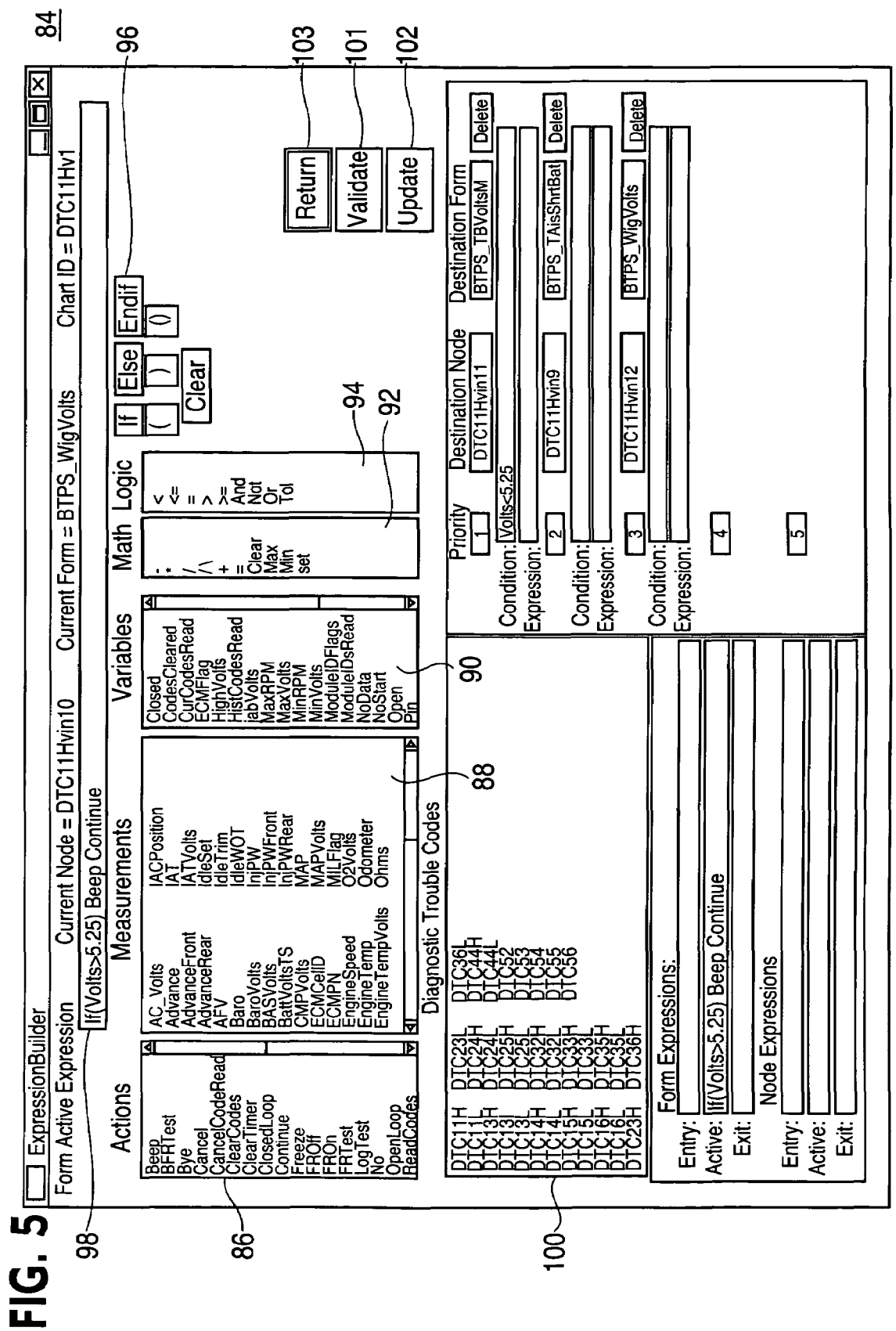
FIG. 5 illustrates an exemplary display screen associated with the EXPRESSION BUILDER step of FIG. 1.

From the flowchart screen 42, shown in FIG. 3, the user may double-click on a color-coded top bar 80 or on a color-coded bottom bar 82 of a node 48, or on a color-coded bulb 50, 52 in order to edit a logical expression. This brings up an expression builder display screen 84 as illustrated in FIG. 5. The expression builder display screen 84 permits the user to associate a vehicle operating parameter or diagnostic condition to a node 48. An expression is a logical statement based on a condition.

A form expression is a generic, or default, logical expression associated with a form. A node expression, on the other hand, is a logical expression unique to a node 48 in a particular flowchart. Thus, a form expression will automatically be performed in association with any node 48 associated with the form, unless the node 48 has been modified with an overriding node expression.

At the expression builder display screen 84, the user may select from a list of actions 86, a list of measurement types 88, a list of variables 90, a list of mathematical operators 92, a list of logical operators 94, or logic condition buttons 96 in order to form the logical expression, which is displayed in the text field 98 near the top of the screen. The user may also include a diagnostic trouble code 100 from the vehicle onboard computer in the logical expression.

After forming a logical expression in the text field 98, the user clicks on the validate button 101 and the expression builder automatically checks, or verifies, the syntax of the logical expression. The user is allowed to click the update button 102 to add the expression to a node 48 only after the syntax of the logical expression has been successfully verified, or validated. By verifying correct syntax, the validate function has the distinct advantage of facilitating development of complex programming sequences by a user that has no working knowledge of a programming language.

The expression builder is a powerful programming tool that allows the user to develop highly complex interactive diagnostic test steps that access test subject information stored in the diagnostic test system, monitor real-time electrical test signals from peripheral devices and sensors associated with the test subject, provide control signals to peripheral devices and controllers associated with the test subject, and incorporate operator input to make logical decisions regarding diagnostic testing. For example, the expression builder provides for comparisons between measurements sensed by peripheral devices and expected values, comparison of two measurements or timers, and the like. The results of this logic can determine the next step in the diagnostic test sequence. The expression builder allows the author to build his own unique logic or choose from expressions that have been previously used.

Thus, a user may incorporate test parameter conditions or logical expressions into any form or node on the flowchart. In addition, the user may associate some action, for example, a beeping sound, with a condition. Furthermore, a user may associate a logical expression with a node or a form in order to control the flow or sequence of test steps within the flowchart. Clicking on the Return button 103 takes the display back to the flowchart display screen 42 (FIG. 3).

Figure 6:
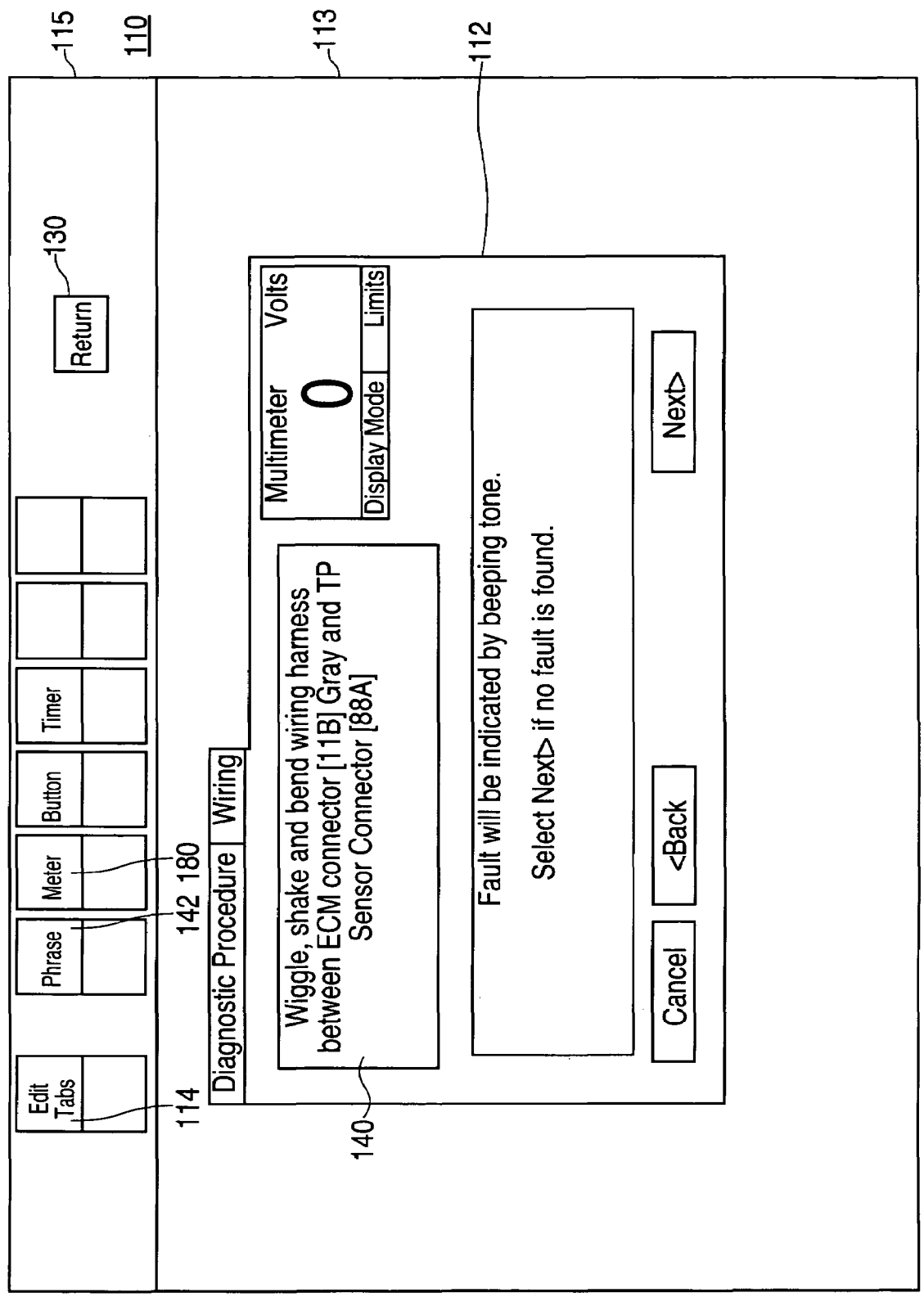
FIG. 6 illustrates an exemplary display screen associated with the PANEL EDITOR step of FIG. 1.

From the flowchart display screen 42, the user may double-click on the center or white portion of a node 83 to edit the form associated with the node. A panel editor display screen 110 then appears, as illustrated in FIG. 6. The panel editor display screen 110 permits the user to design multi-tab panels or display screens with instructions and information used during the diagnostic procedures. The panel editor display screen 110 includes an illustration of the panel display screen 112 in a middle portion 113 of the screen, which will be viewed by the vehicle technician on the vehicle diagnostic system, and various buttons in an upper portion 115 of the screen that allow the user to edit the panel.

Figure 7:
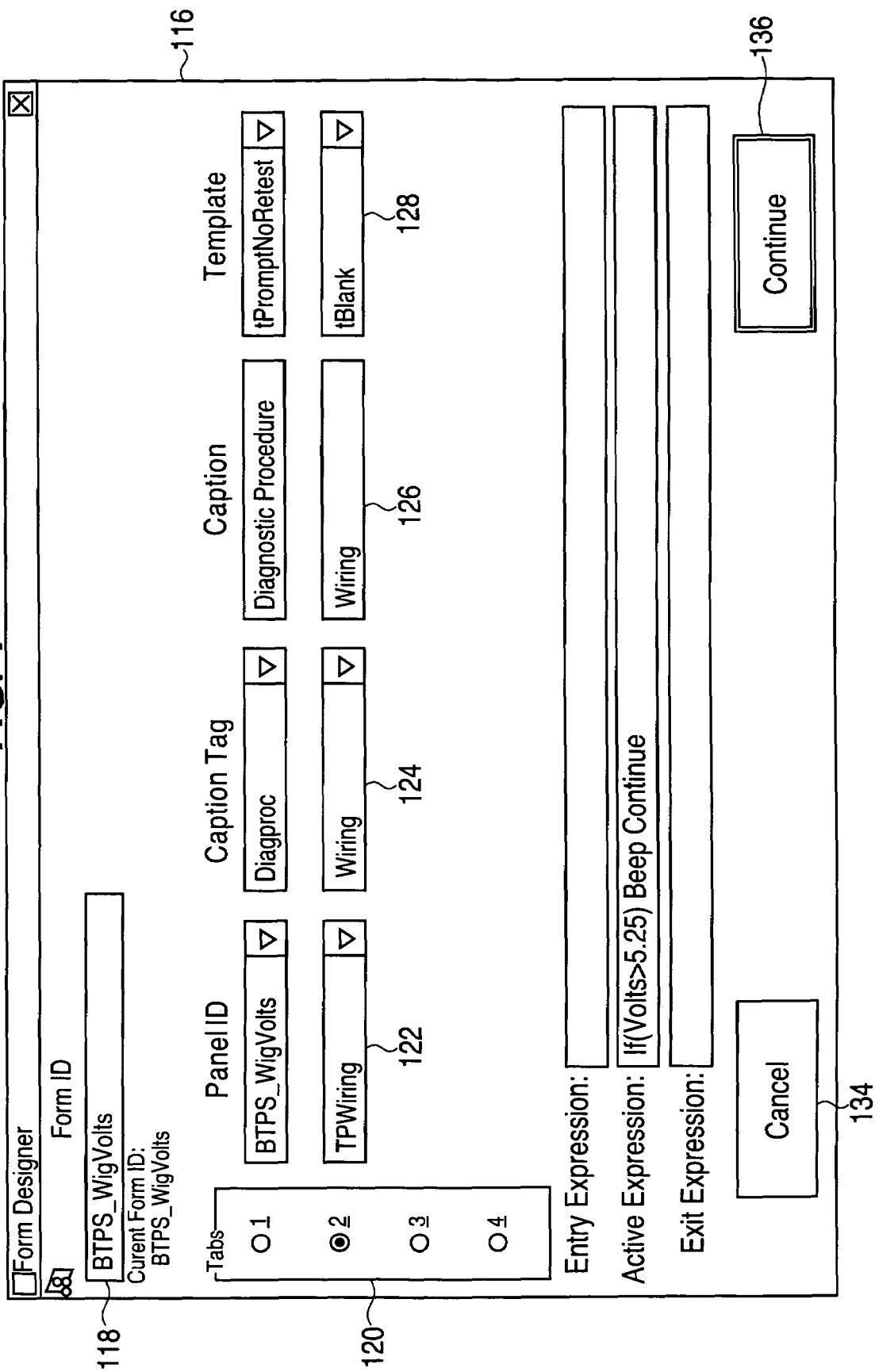
FIG. 7 illustrates a second exemplary display screen associated with the FORM DESIGNER step of FIG. 1.

In order to edit text in a text box 140 on a panel, such as vehicle technician instructions, warnings, or conclusions, the user may double-click on the text box 140 or click on the Phrase button 142 at the top of the screen. Similarly, the Meter button allows a meter to be added to the panel display screen 112. The Return button 130 returns the user to the flowchart display screen 42. The Edit Tabs button 114 brings up the form design screen 116, as illustrated in FIG. 7.

The form design screen 116 permits the user to add and define up to four panels to a form selectable by tabs associated with the form. A form name is selected for the form in the Form ID Field 118 in an upper left corner of the screen 116, which corresponds to the names in the form listing 70, shown in FIG. 4. The user may add or select up to four individual panels or tabs by choosing one of the selectable bullets 120 on the left side of the form design screen 116. The user may select or define a Panel ID 122 for each tab and identify the category of the panel with a caption tag 124 and a corresponding caption 126, which will appear on the panel tab. The user may also select a template 128 on which to base the panel. The user may return to the panel editor screen 110 without saving modifications made on the form design screen 116 by selecting the Cancel button 134. In order to save the changes made on the form design screen 116, the user selects the Continue button 136 and the authoring module returns to the panel editor screen 110 (FIG. 6).

Figure 8:
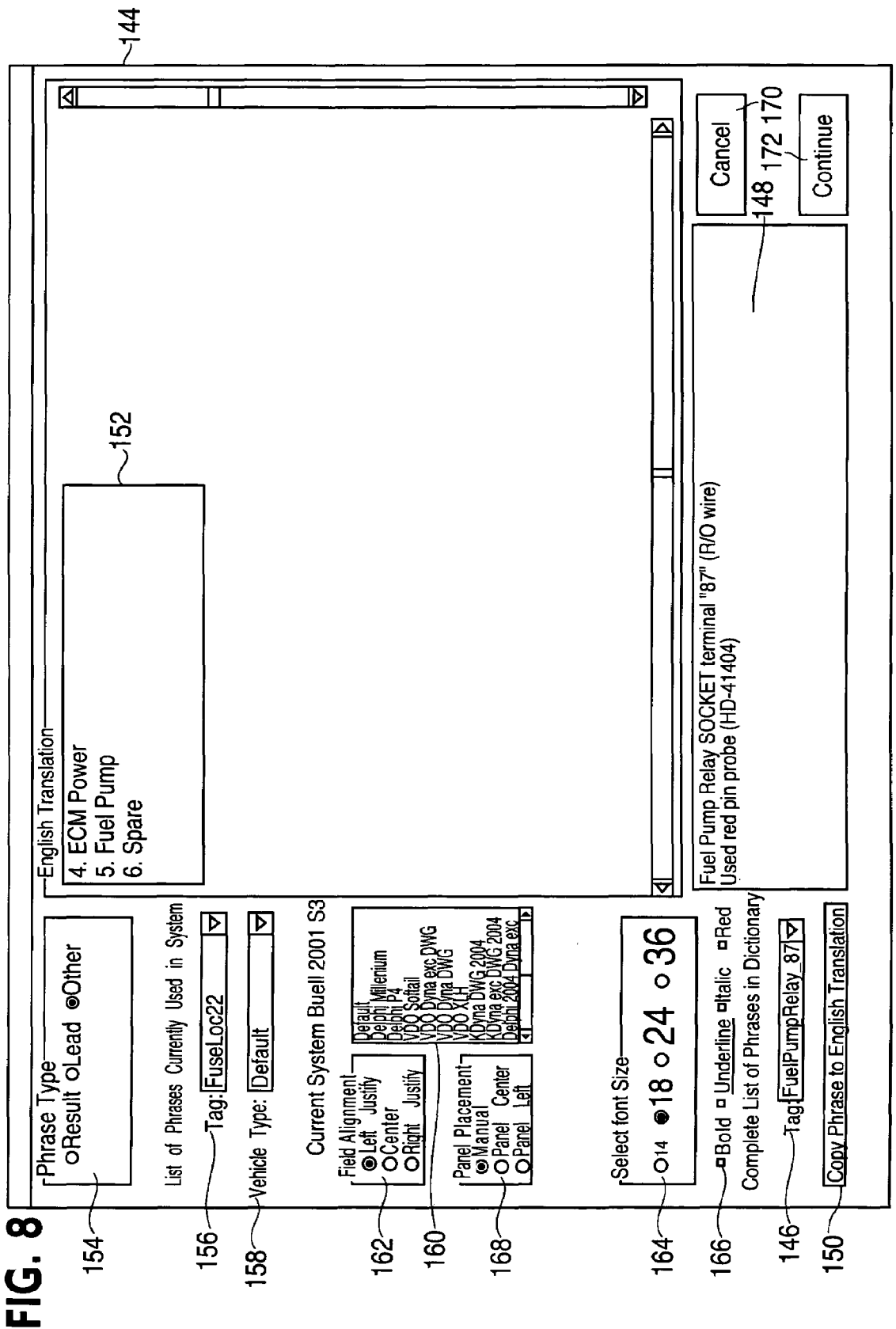
FIG. 8 illustrates an exemplary display screen associated with the PHRASE EDITOR step of FIG. 1.

The phrase editor display screen 144 then appears, as illustrated in FIG. 8. At the phrase editor display screen 144, the user may select an existing phrase from a phrase dictionary or create a new phrase to be used in a text box 140 on the panel. The user may designate a phrase type associated with the text in the text editing field 152 by selecting one of the selectable buttons 154 near the top left corner of the phrase editor display screen 144: Result, Lead or Other.

The user may select an existing phrase from a list of all phrases that have been used on a form associated with a selected vehicle system 158, 160 from the dropdown menu 156, and the text of the selected phrase will appear in the text editing field 152. Otherwise, the user may select an existing phrase from a list of all phrases in the phrase dictionary, including phrases that have not previously been used on a form associated with the selected vehicle system 158, from the dropdown menu 146. In this case, the text of the selected phrase will appear in the lower text field 148, and can then be copied to the text editing field 152 by clicking the Copy Phrase to English Translation button 150.

After the text appears in the text editing window 152, the user may modify the text by making changes to the text in the text editing window 152. The phrase can be renamed by selecting the dropdown menu 156 text field and entering the new name, or tag, directly into the dropdown menu 156 text field. New text may then be entered in the text editing field 152, or the text of the original phrase may be copied into the text editing field 152 for modification by clicking the Copy Phrase to English Translation button 150.

The user may modify the text formatting in the text editing window 152 using the Field Alignment selectable buttons 162, the Select Font Size selectable buttons 164, or the selectable checkboxes 166 for bold, underline, italic or red text. Once the text in the text editing window 152 reflects the phrase that the user would like to place on the panel in the text box 140, the user clicks on the Continue button 172.

The user may select a location for the text box 140 on the panel 112 using the Panel Placement selectable bullets 168 (Manual, Panel Center, Panel Left). Clicking the Continue button 172 saves the changes made to the text box 140 and returns the editor to the panel editor screen 110. Otherwise, the user may click the Cancel button 170 in order to return to the panel editor screen 110 without saving any changes to the text box 140.

Figure 9:
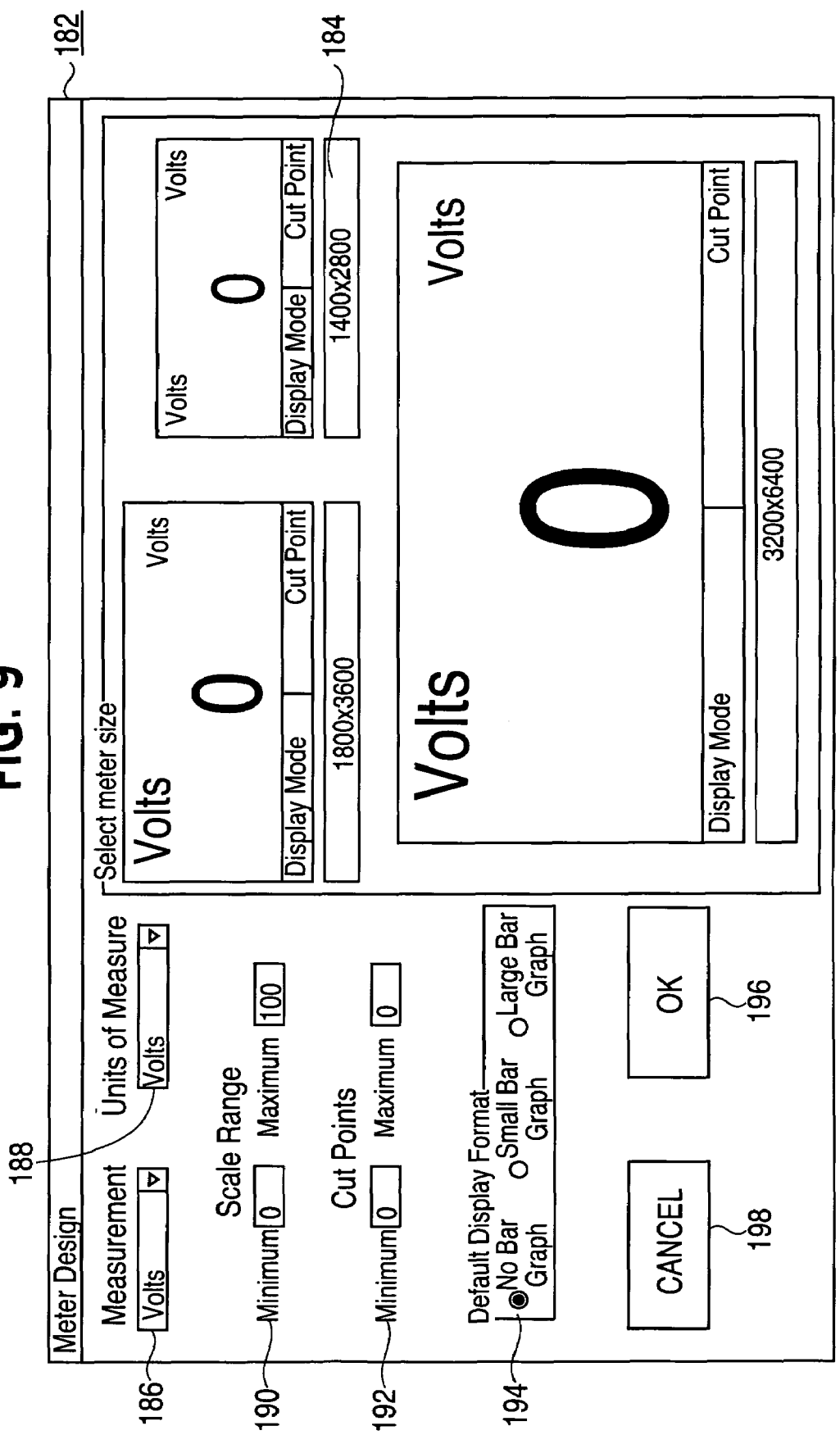
FIG. 9 illustrates an exemplary display screen associated with the METER EDITOR step of FIG. 1.

From the panel editor screen 110 the user may choose to add or edit a meter to the panel 112 by double-clicking on an existing meter shown on the panel editor screen 110 or by clicking the meter button 180 near the top of the panel editor screen 110. The meter editor display screen 182 then appears, as illustrated in FIG. 9. A small, medium, or large sized meter may be selected with one of the Meter Size buttons 184. The user selects a measurement type from a dropdown menu 186 and the desired units of measure from a dropdown menu 188. A range may be entered for the measurement in minimum and maximum editable text fields for the Scale Range 190. In addition, the user may select minimum and maximum cut points by making entries in the editable text fields 192.

For example, if the test sequence requires the engine to be run within a specific RPM range, the author may choose to display a meter with a bar graph that turns green when engine revolutions per minute (RPM) is within the specified range. If the author only wants to know if the engine is running, he may have the meter display the RPM digital measurement only. The user may select an optional bar graph in either a small or large size using the selectable bullets 194 for the display format. The user may then end the meter editor session and return to the panel editor screen, by choosing to save the modifications made to the meter by clicking on the OK button 196, or choosing to not save the changes made to the meter by clicking on the Cancel button 198. In an alternative embodiment, the panel editor allows the user to add diagrams such as a fuse box layout diagram or a wiring diagram to a display panel. Furthermore, a user may add images such as a jpeg file image to a display panel.

Based on the user inputs in the various authoring screens, the flowchart screen 46, the add node screen 68, the expression builder screen 84, the panel editor screen 110, the form design screen 116, the phrase editor screen 144, and the meter editor screen 182, the authoring module compiles an executable vehicle diagnostic test sequence module for use with the vehicle diagnostic system. The executable vehicle diagnostic test sequence may then be used by any vehicle technician for vehicle diagnostic testing.

Thus, the vehicle diagnostic test sequence authoring module enables a vehicle diagnostics expert with no specific knowledge of a computer programming language to develop an executable program module for a vehicle diagnostic test sequence for use with the vehicle diagnostic system.

In an alternative embodiment of the present invention, the executable vehicle diagnostic test sequence program is not compiled by the authoring module but rather is compiled at run time when a vehicle technician operates the vehicle diagnostic system. In this embodiment, the authoring module stores data in a database, or in multiple databases, that will be used by the vehicle diagnostic system at run time during a vehicle diagnostic session.

For example, in an embodiment, flowchart details regarding the nodes, branches and node expressions are placed in a system database. In this example, data regarding the vehicle type, the flowcharts associated with the vehicle type, the forms associated with a flowchart, panels and data regarding controls—that is the text boxes, meters and the like on a panel—are stored in a common database. In this embodiment, the common database contains data mapping the various flowcharts, nodes, forms, and panels to each other. The common database also contains data regarding form expressions.

Furthermore, in this embodiment, data regarding the text boxes on the various display panels is stored in a dictionary database and is identified by tags. The dictionary database contains data for each supported language. For example, the dictionary database contains a data set for English translation text boxes associated with a display panel, and a separate set of data for German translations associated with the same display panel. Any language can be used in this embodiment by simply having a language module for that language.

In another embodiment of the present invention, the authoring module, including the expression builder, the form editor, the phrase editor, and the meter editor, shares memory with other vehicle diagnostic system modules and between the authoring module segments in a shared memory block. In a preferred embodiment, the shared memory block is of the global signaling memory system (GLOBS) type, which is a computer assisted or implemented system designed to allow multiple applications, such as software programs, algorithms, scripts, or other computer implemented or assisted applications, to share data that is stored in a shared memory location or multiple shared memory locations. A global signaling memory system of this type is disclosed in U.S. patent application Ser. No. 09/841,857, Gilbert et al., entitled "Global Signaling Memory," filed on Apr. 25, 2001 (see Patent Application Publication No. 2002/0073241, published on Jun. 13, 2002) the disclosure of which is hereby incorporated by reference in its entirety.

A preferred embodiment of the present invention communicates information to the user and requests user input by way of an interactive, menu-driven, visual display-based user interface. The authoring module is executed on a PC with a mouse and keyboard, with which the user may interactively input information using direct manipulation of a graphical user interface (GUI). Direct manipulation includes using a pointing device, such as a mouse, to select from a variety of selectable fields, including selectable menus, tabs, buttons, bullets, checkboxes, text boxes, and the like. Nevertheless, other embodiments of the invention may incorporate any number of additional functional user interface schemes in place of this interface scheme, with or without the use of a mouse or buttons or keys, including for example, a trackball, a touchscreen or a voice-activated system.

In some embodiments, the authoring module is executed on a common personal computer (PC). However, in other embodiments the authoring module could be executed on any suitable processor, such as a server, a personal computer, a Personal Digital Assistant, a collection of networked servers or personal computers, a mainframe computer, or the like. Additionally, as new tests are developed, the system can be updated so that the user does not have to constantly buy new systems Thus, the authoring module is that it provides a windows environment, menu-driven user interface that allows a vehicle diagnostics expert to develop, or author, new or improved diagnostic test sequences for the vehicle diagnostics system without requiring knowledge of a computer programming language. The authoring module provides menu-based navigation through a comprehensive sequence of display screens that guide the user, or author, through the diagnostics test sequence authoring procedure. Once the user has authored a diagnostic test sequence, the test sequence can be used with the vehicle diagnostic system to guide a novice or experienced vehicle technician through a basic or complex vehicle diagnostic test sequence.

Although an exemplary embodiment of the present invention has been described with reference to a vehicle, or automotive, diagnostics system authoring module, it will be appreciated that other embodiments include authoring modules for various other types of diagnostics systems, such as heavy equipment diagnostics systems, aircraft diagnostics systems, medical diagnostics systems, or the like. Alternative embodiments include authoring modules for a vast array of diagnostics systems for relatively "hi-tech" as well as less technologically sophisticated products and systems, including virtually any electrical and mechanical devices, such as automated manufacturing machines, robotic devices, building heating and cooling systems, furnaces, hot tubs, and the like.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An authoring tool executable by a computer with memory, comprising:
   a flowchart module to create or modify a diagnostic test sequence, the flowchart module including a first display image with a plurality of selectable fields to facilitate creating or modifying the diagnostic test sequence;
   a panel editor module to create or modify a display panel that displays an instruction associated with the diagnostic test sequence during diagnostic testing, the panel editor module including a second display image with a plurality of selectable fields to facilitate creating or modifying the display panel; and
   an expression editor module to create or modify a logical expression associated with the diagnostic test sequence, the expression editor module including a third display image with a plurality of selectable fields to facilitate creating or modifying the logical expression; wherein the flowchart module incorporates the display panel and the logical expression into the diagnostic test sequence.

2. The authoring tool of claim 1, wherein the expression editor module is configured to evaluate a syntax of the logical expression in order to produce a valid computer program code to execute the logical expression.

3. The authoring tool of claim 1, wherein the expression editor module is configured to create or modify the logical expression to evaluate data, including a plurality of data types from a plurality of data sources, in order to determine a test action or make a test sequence decision based on the data.

4. The authoring tool of claim 1, wherein the logical expression is associated with a test step to determine an action to be taken if the logical expression is valid.

5. The authoring tool of claim 1, wherein the logical expression is associated with a branch to determine a next test step of the diagnostic test sequence if the logical expression is valid.

6. The authoring tool of claim 1, wherein diagnostic test sequence data is stored to a database in a memory device.

7. The authoring tool of claim 1, wherein the modules store data in a memory device using a global signaling memory system, whereby the modules communicate to share the data.

8. The authoring tool of claim 7, wherein the expression editor module is configured to create or modify the logical expression to evaluate data from the global signaling memory system in order to determine a test action or make a test sequence decision based on the data.

9. The authoring tool of claim 8, wherein the expression editor module is further configured to create or modify the logical expression to evaluate data received from a peripheral device in order to determine a test action or make a test sequence decision based on the data.

10. The authoring tool of claim 8, wherein the expression editor module is further configured to create or modify the logical expression to evaluate user input data in order to determine a test action or make a test sequence decision based on the data.

11. The authoring tool of claim 8, wherein the expression editor module is further configured to create or modify the logical expression to generate a command signal to send to a peripheral device in order to command the peripheral device to perform a test action.

12. The authoring tool of claim 1, wherein node data, branch data and node logical expression data are stored to a system database in a memory device; test subject data, flowchart data, form data, panel data, tab data, meter data and form logical expression data are stored to a common database in the memory device; and text and language data are stored to a dictionary database in the memory device.

13. The authoring tool of claim 12, wherein the expression editor module is configured to create or modify the logical expression to evaluate system data from the system database and common data from the common database in order to determine a test action or make a test sequence decision based on the system data and the common data.

14. The authoring tool of claim 1, wherein the diagnostic test sequence includes a test step represented by a node.

15. The authoring tool of claim 14, wherein the diagnostic test sequence is represented by a flowchart, and a flow path from the node to a next node is represented by a branch.

16. The authoring tool of claim 1, wherein the first, second and third display images comprise a graphical user interface (GUI) whereby the diagnostic test sequence, the display panel and the logical expression are created or modified through direct manipulation of displayed graphical representations of objects and symbols by way of an alphanumeric keyboard and a pointing device.

17. The authoring tool of claim 1, further comprising a phrase editor module to create or modify a text on the display panel, the phrase editor module including a fourth display image with a plurality of selectable fields to facilitate creating or modifying the text, wherein the panel editor module incorporates the text into the display panel.

18. The authoring tool of claim 17, wherein the fourth display image comprises a graphical user interface (GUI) whereby the text is created or modified through direct manipulation of displayed graphical representations of objects and symbols by way of an alphanumeric keyboard and a pointing device.

19. The authoring tool of claim 1, further comprising a meter editor module to create or modify a meter on the display panel, the meter editor module including a fourth display image with a plurality of selectable fields to facilitate creating or modifying the meter, wherein the panel editor module incorporates the meter into the display panel.

20. The authoring tool of claim 19, wherein the fourth display image comprises a graphical user interface (GUI) whereby the meter is created or modified through direct manipulation of displayed graphical representations of objects and symbols by way of an alphanumeric keyboard and a pointing device.

21. An authoring tool on a computer readable media and executable on a processor, comprising:
   a flowchart module to create or modify a diagnostic test sequence, the flowchart module including a first display image with a plurality of selectable fields to facilitate creating or modifying the diagnostic test sequence, wherein the diagnostic test sequence is represented by a hierarchical flowchart including a test step represented by a node and a flow path from the node to a next node represented by a branch;

a panel editor module to create or modify a display panel associated with the node that displays an instruction associated with the diagnostic test sequence during diagnostic testing, the panel editor module including a second display image with a plurality of selectable fields to facilitate creating or modifying the display panel;

a phrase editor module to create or modify a text on the display panel, the phrase editor module including a third display image with a plurality of selectable fields to facilitate creating or modifying the text;

a meter editor module to create or modify a meter on the display panel, the meter editor module including a fourth display image with a plurality of selectable fields to facilitate creating or modifying the meter; and an expression editor module to create or modify a logical expression associated with the flowchart to evaluate data, including a plurality of data types from a plurality of data sources, in order to determine a test action or make a test sequence decision based on the data, the expression editor module evaluating a syntax of the logical expression in order to produce a valid computer program code to execute the logical expression, the expression editor module including a fifth display image with a plurality of selectable fields to facilitate creating or modifying the logical expression;

wherein the first, second, third, fourth and fifth display images comprise a graphical user interface (GUI) whereby the diagnostic test sequence, the display panel, the text, the meter and the logical expression are created or modified through direct manipulation of displayed graphical representations of objects and symbols by way of an alphanumeric keyboard and a pointing device; and the panel editor module incorporates the text and the meter into the display panel, and the flowchart module incorporates the display panel and the logical expression into the flowchart; and diagnostic test sequence data is stored to at least one database in a memory device.

22. The authoring tool of claim 21, wherein the logical expression is associated with the node to determine an action to be taken if the logical expression is valid.

23. The authoring tool of claim 21, wherein the logical expression is associated with a branch to determine a next test step of the diagnostic test sequence if the logical expression is valid.

24. The authoring tool of claim 21, wherein the modules store data in a memory device using a global signaling memory system, whereby the modules communicate to share the data.

25. A method of providing diagnostic test sequence authoring capability, comprising the steps of:

displaying a first display image with a plurality of selectable fields to facilitate creating or modifying a diagnostic test sequence;

displaying a second display image with a plurality of selectable fields to facilitate creating or modifying a display panel to display an instruction associated with the diagnostic test sequence during diagnostic testing;

displaying a third display image with a plurality of selectable fields to facilitate creating or modifying a text on the display panel;

displaying a fourth display image with a plurality of selectable fields to facilitate creating or modifying a logical expression associated with the diagnostic test sequence to evaluate data, including a plurality of data types from a plurality of data sources, in order to determine a test action or make a test sequence decision based on the data;

evaluating a syntax of the logical expression in order to produce a valid computer program code to execute the logical expression;

receiving user input through direct manipulation of a graphical user interface (GUI) by way of an alphanumeric keyboard and a pointing device, including input to modify the text or input to select one of the plurality of selectable fields; and creating a diagnostic test sequence incorporating the display panel and the logical expression.

26. The method of providing diagnostic test sequence authoring capability of claim 25, further comprising the step of storing diagnostic test sequence data, display panel data and logical expression data in a database.

27. The method of providing diagnostic test sequence authoring capability of claim 25, further comprising the step of communicating shared data by way of a global signaling memory system.

28. An authoring tool in a computer with memory, comprising:

means for creating or modifying a diagnostic test sequence, including means for displaying a first display image with a plurality of selectable fields to facilitate creating or modifying the diagnostic test sequence;

means for creating or modifying a display panel that displays an instruction associated with the diagnostic test sequence during diagnostic testing, including means for displaying a second display image with a plurality of selectable fields to facilitate creating or modifying the display panel;

means for creating or modifying a text on the display panel, including means for displaying a third display image with a plurality of selectable fields to facilitate creating or modifying the text; and means for creating or modifying a logical expression associated with the diagnostic test sequence to evaluate data, including a plurality of data types from a plurality of data sources, in order to determine a test action or make a test sequence decision based on the data, including means for evaluating a syntax of the logical expression in order to produce a valid computer program code to execute the logical expression and means for displaying a fourth display image with a plurality of selectable fields to facilitate creating or modifying the logical expression;

wherein the first, second, third and fourth display images comprise a graphical user interface (GUI) whereby the diagnostic test sequence, the display panel, the text and the logical expression are created or modified through direct manipulation of displayed graphical representations of objects and symbols by way of an alphanumeric keyboard and a pointing device; and the means for creating or modifying a diagnostic test sequence incorporates the display panel and the logical expression into the diagnostic test sequence.

29. The authoring tool of claim 28, further comprising means for storing diagnostic test sequence data to a database in a memory device.

30. The authoring tool of claim 28, further comprising means for communicating shared data by way of a global signaling memory system.

* * * * *